United States Patent

[11] 3,629,558

| [72] | Inventor | James R. Coggin<br>Dayton, Ohio |
|---|---|---|
| [21] | Appl. No. | 857,402 |
| [22] | Filed | Sept. 12, 1969 |
| [45] | Patented | Dec. 21, 1971 |
| [73] | Assignee | The Bendix Corporation |

[54] METHOD FOR PREPARING CONTROL TAPES
9 Claims, 7 Drawing Figs.

[52] U.S. Cl. .................................................. 235/151.1,
234/3, 318/568
[51] Int. Cl. ...................................................... G06f 15/46
[50] Field of Search.......................................... 235/151,
151.1, 154, 150.1; 318/567, 569, 570, 573, 574,
568; 234/1–3; 346/8, 33; 33/23 H; 340/172.5;
40/13 C

[56] References Cited
UNITED STATES PATENTS
2,999,196  9/1961  Martin.......................... 318/567

3,391,392  7/1968  Doyle............................ 235/151.1 X
3,423,656  1/1969  Tripp............................. 318/570

Primary Examiner—Malcom A. Morrison
Assistant Examiner—Jerry Smith
Attorneys—William F. Thornton, Barnard, McGlynn &
Reising and Plante, Arens, Hartz, Hix and Smith ABSTRACT: A method of preparing a numerical control record of minimum length defining the surface of a part to a predetermined degree of accuracy by scanning the surface, placing the coordinates of a plurality of measured points in temporary storage, optimizing the data by examining each point to determine whether its chord height equals or exceeds a reference value, and transferring to the control record only those points determined on the basis of the chord height measurement to be required for adequate surface definition. A computer controlled apparatus for performing the method is disclosed.

INVENTOR.
James R. Coggin
BY
Barnard, McGlynn & Reising
ATTORNEYS

INVENTOR.
James R. Coggin
BY
Barnard, McGlynn & Reising
ATTORNEYS

METHOD FOR PREPARING CONTROL TAPES

This invention relates to numerical control systems and more particularly to a method for producing a numerical control record containing coordinate data defining a surface contour to a predetermined degree of accuracy.

The term "numerical control" as used herein refers to controlling the operations of a machine by means of a prepared record which contains information in coded form to define the desired machine operations. An example of numerical control is the direction of a milling machine to reproduce a desired surface contour by means of a punched tape record which contains a coded definition of the contour. This tape record is generally prepared by scanning a model surface to obtain coordinate data and placing such data on the tape record in coded form.

In the example given above, the milling machine generally comprises a tool which is adjusted in position relative to a workpiece each time a new set of coordinates is read from the control record. Accordingly, the accuracy with which the machine tool path approximates the original model surface depends upon the accuracy and quantity of information stored in the control record during the scanning operation. Assuming the machine tool is displaced along one axis at a substantially constant rate, the accurate reproduction of a surface area having a high degree of contour, i.e., a short radius of curvature, requires that new coordinate information be made available to the machine at a high rate. This condition can be satisfied by establishing a rapid data-sampling rate during the original scanning operation. A model surface may exhibit areas of both rapidly and slowly varying contour. Accordingly, a constant data-sampling rate must ordinarily be fixed by reference to the rapidly varying contour area since to fix the rate by reference to the slowly varying contour area would necessarily result in a loss of accuracy in the rapidly varying contour area. However, setting the sampling rate at a high level usually results in sampling more data than is necessary to reproduce a relatively flat surface area to a predetermined degree of accuracy and the control record becomes unnecessarily long.

One way to avoid the production of a control record of undue length is to vary the sampling rate according to the degree of contour of the model surface. This technique requires the use of rate responsive control mechanisms in the scanning and sampling apparatus which may add considerable cost and complexity to the apparatus.

In accordance with the present invention, a numerical control record of minimum length is prepared so as to consistently define a model surface to a predetermined degree of accuracy without requiring variation in the sampling rate in proportion to surface contour. In general, this is accomplished by means of a process which involves scanning a model surface to obtain data representing the coordinates of a probe traveling over a plurality of spaced points on the surface, optimizing the data so obtained by effectively determining the need for each point-defining coordinate set in maintaining the accuracy standard and transferring to the control record only those point-defining coordinates which are so needed.

In a preferred manifestation of the subject method, triaxial coordinates are sampled at predetermined uniform increments of probe displacement within a preestablished coordinate system and optimized by comparing the distance between a point and a chord extending between two surrounding points to a reference distance and transferring to the control record an initial point and only such points as are found to be at least the reference distance from the chord.

While the subject method may be carried out wholly or partly by hand and using conventional scanning and measuring apparatus and techniques, the method is preferably and most expeditiously carried out with the use of commercially available scanning, digitizing, computing, and tape-punching apparatus. Therefore, the following specification and drawing disclose not only the method but also the apparatus which is believed to represent the best and most practicable mode of carrying out the inventive method. Of course, the method may also be practiced with implementations of lesser degrees of sophistication.

Figure 1:
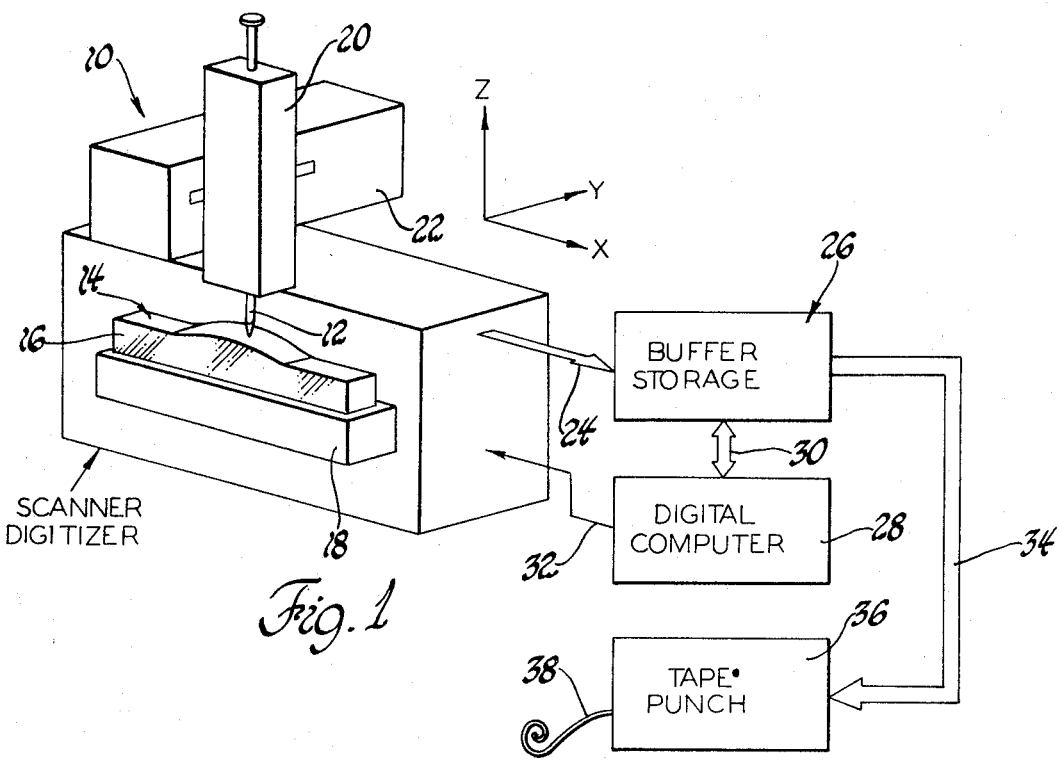
FIG. 1 is a block diagram of an apparatus for carrying out the invention.

Referring to FIG. 1, an illustrative apparatus for carrying out the invention is shown to comprise a scanning and digitizing unit 10 having a probe 12 which is adapted to contact the contoured surface 14 of a part model 16. The unit 10 includes a bed 18 for receiving the model 16 in a reference position thereby to establish a set of mutually perpendicular coordinate area, identified in FIG. 1 as X, Y and Z, with reference to which the coordinates of the surface 14 are to be scanned and measured.

The scanning and digitizing unit 10 comprises a carriage which permits triaxial movement of probe 12 relative to the bed 18 during the scanning process. This carriage includes a housing 20 which receives the probe 12 for displacement relative thereto along the Z-axis, and a housing 22 which carries the housing 20 and permits displacement thereof along the Y-axis. The combination of probe 12 and housings 20 and 22 is also displaceable relative to the body of unit 10 along the X-axis to complete the triaxial capability of probe 12. Probe 12 is biased into engagement with the surface 14 and is generally of such a configuration as to correspond to the cutter tool which is used in the controlled machine (not shown) to reproduce the surface 14 of model 16. The carriages provided in housings 20 and 22 contain coordinate signal-generating means such as linear variable differential transformers to produce output signals representing the triaxial coordinates of probe 12 relative to the reference bed 18. In addition, the unit 10 contains apparatus for converting the coordinate signals to digital form. The particular configuration of unit 10 is well known in the art, and the details of the apparatus are omitted for the sake of brevity. A suitable scanning and digitizing device for unit 10 is the Sheffield Cordax Measuring System available from the Automation and Measurement Division of Bendix Corporation.

The coordinate data generated by unit 10 is transferred through a parallel type data channel 24 to a buffer storage unit 26 under the control of a general purpose digital computer 28. Access to the contents of the buffer storage unit 26 is provided for the computer 28 by means of a data channel 30. The control connection between computer 28 and the measurement unit 10 is provided by means of a control line 32. As is well known to those skilled in the art computer 28 comprises suitable control, storage, and computational units for performing various arithmetic functions on data which is presented in digital form. A suitable general purpose computer for use in the apparatus of FIG. 1 is the model PDP-8 which is produced by the Digital Equipment Corporation. Finally, the buffer storage unit 26 is connected through a data channel 34 to the input of a paper tape punch 36 which is adapted to produce a numerical control record in the form of a paper tape 38 having punched holes which represent coordinate data in numerically coded form. Although a punched paper tape is preferred, it is to be understood that the numerically controlled record may be placed on any suitable information storage medium such as a magnetic tape or disc.

Figure 6:
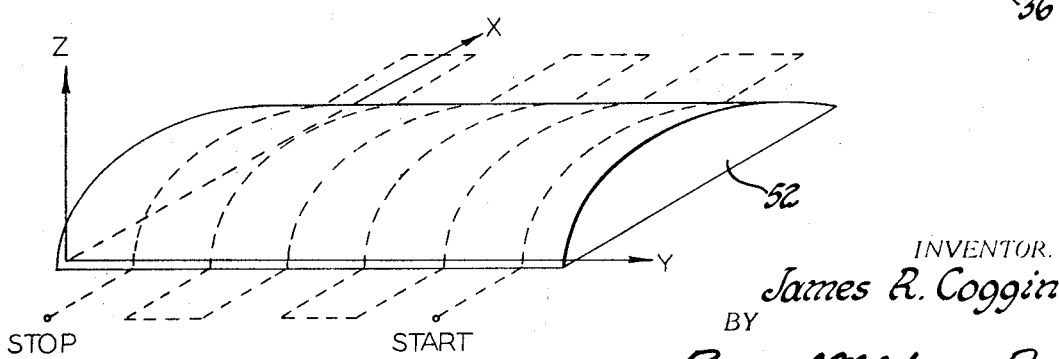
FIG. 6 is a perspective view of a model surface illustrating a scanning technique.

In operation, the apparatus of FIG. 1 is actuated such that the contacting probe 12 scans the surface 14 of model 16 in a systematic fashion to produce data representing the coordinates of a plurality of points along the surface 14. FIG. 6 illustrates such a systematic scanning procedure as applied to the inspection of a contoured turbine blade 52. As shown in FIG. 6 the scanning operation is performed by displacing the probe 12 of FIG. 1 along the path defined by the broken line beginning at the point marked "Start." This path indicates that the probe 12 is displaced along the X-axis, holding the Y-axis coordinate constant for each pass of the probe 12 over the surface of the turbine blade 52. Accordingly, during each pass the probe 12 is displaced along the Z-axis in accordance with the contour of the turbine blade surface. At the end of each pass the unit 10 is adjusted either manually or automatically to define a new Y-coordinate which again is held constant during the pass of the probe over the turbine blade 52 by displacement of the housing 22 in the X-axis direction. The process of scanning the turbine blade 52 may be carried out as many times as is necessary to adequately define the entire surface contour of the blade.

The coordinate data which is obtained during the scanning step is continually transferred through the channel 24 to the buffer storage unit 26 where access to the data is provided to the computer 28 through the channel 30. After the coordinates of a predetermined number of points on the surface 14 have been transferred to the buffer storage unit 26, a step of optimizing the data prior to transfer thereof to the tape punch 36 is begun.

Figure 2:
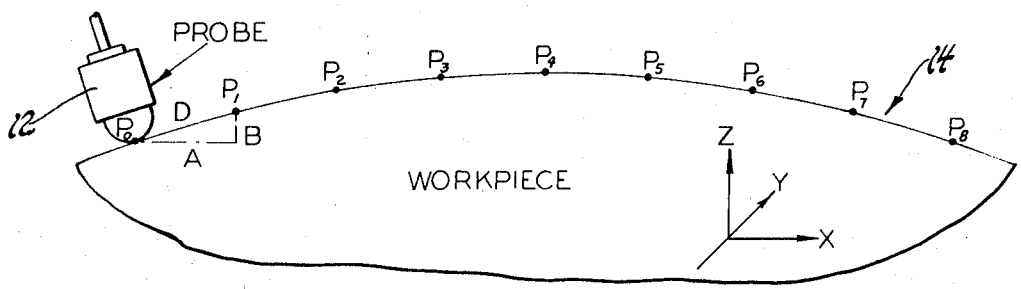
FIG. 2 is a diagram of a model surface illustrating the method of coordinate recording.

Referring to FIG. 2, a representative portion of the surface 14 is shown in enlarged scale with the probe 12 being in contact therewith and beginning the pass from left to right along the X-axis. The coordinates of each of a group of spaced points identified as $P_0$ through $P_7$ are sampled and transferred to the buffer storage unit 26 of FIG. 1. The points are shown on the surface 14 but in actuality may represent the path of some portion of the probe 12. To accomplish this the computer 28 is enabled by an operator to send a control signal to the unit 10 to start sampling the coordinates of the surface 14. Unit 10 samples the initial point $P_0$ and begins the pass of the probe 12 over the surface 14. As the probe 12 displaces along the X-axis toward point $P_1$, the coordinates of the probe position are constantly entered into the buffer storage unit 26. However, in a preferred embodiment, the coordinates are not stored, until the total displacement of the probe 12 approaches some predetermined fixed limit such as 0.0440 inch. This limit may, of course, be adjusted by the operator through suitable programming of the computer 28. In order to determine whether the probe 12 has been displaced through the 0.0440 inch displacement limit the computer 28 may be programmed to continuously add the total X-axis displacement to the total Z-axis displacement and to compare the sum of such displacements nonvectorially to a reference value of 0.0440, a simple arithmetic operation which can be performed by any general purpose computer. As soon as the total displacement of probe 12 equals or exceeds the limit of 0.0440 inch, the coordinates of the probe 12 are placed in storage for the optimizing operation. This process is carried out through the points $P_2$, $P_3$ and so forth until a large number of points have been recorded and stored in the buffer set 46. As an alternative to the above-described step of obtaining coordinate data at predetermined increments of total probe displacement, the sampling rate may be set to correspond with equal increments of displacement of probe 12 along the X-axis. In addition, where an automated scan is contemplated at a fixed rate the sampling rate may be simply fixed by reference to a fixed clock rate such that coordinate data are obtained during the displacement period of probe 12. Accordingly, various scanning and sampling techniques can be employed as long as coordinates are obtained at a high enough rate relative to probe displacement to ultimately define the surface 14 to a predetermined degree of accuracy.

Once the coordinates of a predetermined number of the points have been entered in the buffer storage unit 26, the step of optimizing the data is begun under the control of the digital computer 28. Optimizing the data is accomplished by examining the coordinates and identifying those points which essentially represent a change in the Z-coordinate relative to the same coordinate of a previous point which is greater than some predetermined reference value and segregating such points from all other points prior to transfer to the tape punch unit 36. Accordingly, the tape punch unit 36 receives only the coordinates of such points as are necessary to define the surface 14 to a degree of accuracy which is established by the operator. Furthermore, the operator is capable of predetermining this degree of accuracy by establishing the Z-axis change or an approximation thereof which determines the desirability of recording any given point.

Figure 3:
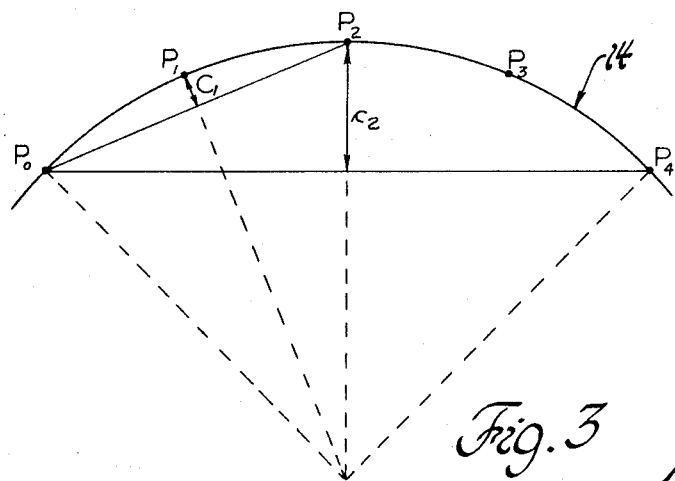
FIG. 3 is a diagram of a model surface in enlarged scale showing a method for optimizing data.
Figure 4:
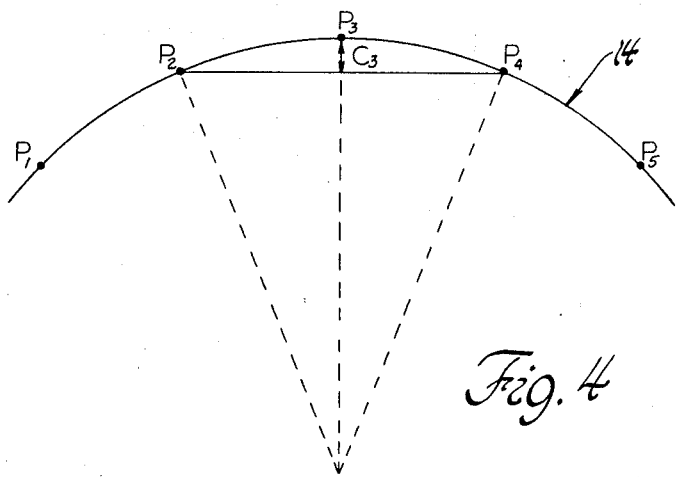
FIG. 4 is also a diagram of a model surface in enlarged scale illustrating the method of data optimization.

The manner in which the optimization step is preferably carried out is illustrated in FIGS. 3 and 4 and is easily adaptable for execution by a digital computer as will be apparent to those skilled in the art. In FIG. 3 it is assumed that the coordinates of points $P_0$ through $P_4$ have been entered into the buffer storage unit 26. First, the coordinates of the initial point $P_0$ are transferred to the tape punch unit 36. The next step is to examine the coordinates of point $P_1$ to determine whether it is necessary within the degree of accuracy set by the operator to also transfer the coordinates of $P_1$ to the tape punch unit 36. To determine this, a chord is established between the points $P_0$ and $P_2$. The point $P_1$ thus falls approximately in the center of the two ends of the chord by virtue of the relatively uniform increments of displacement between the points. At this time the distance between the point $P_1$ and the chord drawn between $P_0$ and $P_2$ is measured along a line perpendicularly intersecting a tangent to the surface at $P_1$. This distance is designated as the chord height $C_1$ and may be readily compared with a reference value T such that if the chord height $C_1$ equals or exceeds T, the coordinates of $P_1$ are deemed necessary to record whereas if the chord height $C_1$ is less than T the coordinates of $P_1$ are not necessary to define the surface 14 within the predetermined limits of accuracy. As an alternative to measuring the chord height along the perpendicular bisector of the $P_1$ tangent, the chord height may also be measured along the Z-axis without significant loss of accuracy.

Assuming that the chord height $C_1$ is less than the established reference value T the result of the comparison operation in computer 28 is simply not to transfer the coordinates of $P_1$ to punch unit 36. In this case, the chord height $C_2$ at $P_2$ is next determined. This is accomplished by drawing a chord between the points $P_0$ and $P_4$ such that the point $P_2$ lies substantially centrally between the extremities of the chord. The chord height $C_2$ is measured along a line which perpendicularly intersects the tangent line drawn through $P_2$ and is compared to T. Assuming the chord height $C_2$ exceeds T the coordinates of $P_2$ are deemed necessary to define the surface 14 within the predetermined limits of accuracy and accordingly the computer commands that the coordinates of $P_2$ are transferred to the tape punch unit 36. As will be appreciated by those skilled in the art, it is a relatively simple matter to instruct a computer to perform a comparison and transfer operation.

Assuming that the coordinates of $P_2$ are deemed necessary to the definition of surface 14 and are transferred to the tape punch unit 36 for storage on the numerical control record, the cord height at the point $P_3$ is next determined. Referring to FIG. 4, this determination is carried out by establishing a chord between $P_2$ and $P_4$ and measuring the chord height $C_3$ relative to this chord. Again, the chord height $C_3$ is compared to T and if the chord height $C_3$ equals or exceeds T, the coordinates of $P_3$ are transferred to the tape punch unit 36 for storage in the numerical control record. If $C_3$ does not equal or exceed T, the chord height at $P_4$ is measured relative to a chord extending between $P_2$ and $P_6$ in the same manner.

As previously described, the process of measuring the chord height and comparing the chord height at the various points to a reference value is easily carried out by the general purpose digital computer 28 using conventional programming techniques. Referring to FIG. 3, the chord height $C_1$ may be calculated by programming the computer 28 to solve the following equation using the coordinate data from points $P_0$, $P_1$, and $P_2$:

$$C = \sqrt{A^2 - \left(\frac{\overline{A} \cdot \overline{B}}{B}\right)2}$$

where:

A equals the magnitude of the vector quantity between $P_0$ and $P_1$, and

B equals the magnitude of the vector quantity between $P_0$ and $P_2$.

After the chord height $C_1$ is determined, it is compared with the tolerance T specified by the operator and representing the predetermined reference value to which all of the subsequently determined chord heights are compared. If the chord height $C_1$ equals or exceeds the tolerance T, the computer automatically transfers the coordinates of $P_1$ to the tape punch unit 36.

Figure 5:
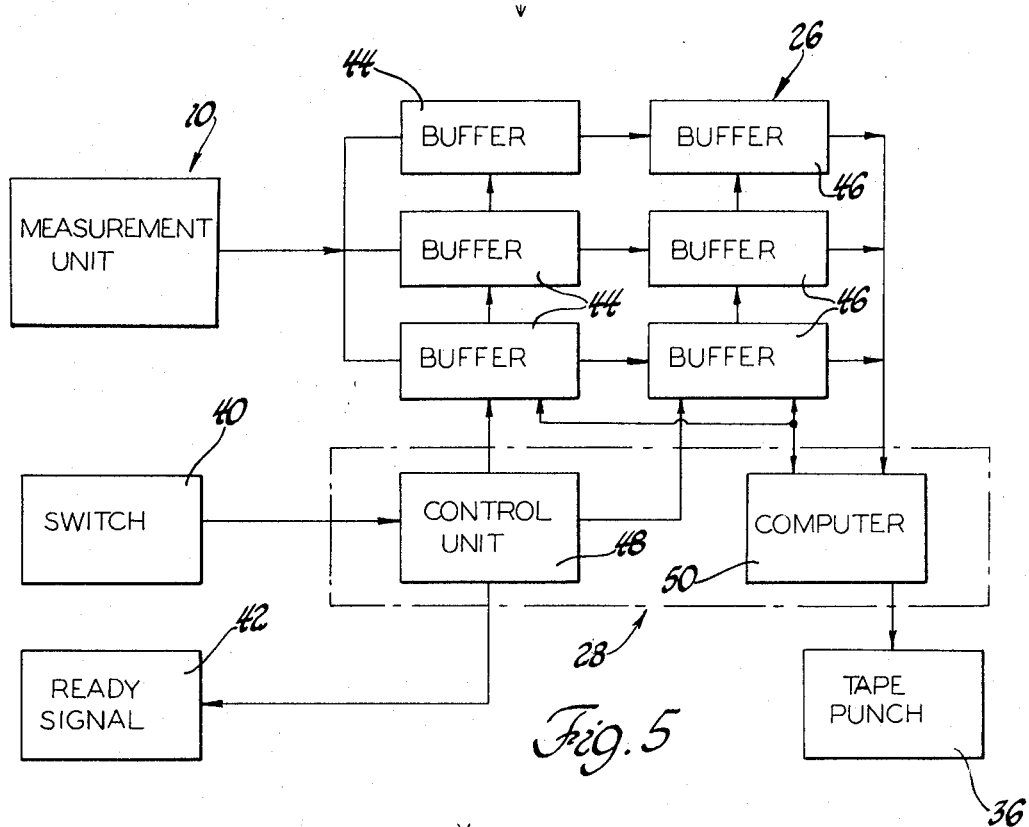
FIG. 5 is a block diagram of a preferred apparatus for carrying out the method.

FIG. 5 illustrates a computer arrangement which can be employed to carry out the subject method. In FIG. 5 the measurement unit 10 is shown having an output connected to the first of two buffer register sets 44 and 46 of the storage unit 26. Each buffer register set 44 and 46 includes three registers for storing the three axial coordinates of any given point in binary coded decimal form. The computer 28 includes a control unit 48 having an operator switch 40 connected to the input thereof to control the start of the computerized process. Control unit 48 is also connected to a signal device 42 such as a bell or lamp to indicate the readiness of the computer 28 to accept data from the measurement unit 10. Buffer register set 44 is serially connected with the second buffer register set 46 such that the three coded coordinates can be transferred from 44 to 46 under control of the computer 28. The first buffer set 44 is employed to store the coordinate data prior to X-axis incremental analysis, and the second register set 46 is provided to store the point coordinate data during the optimization step previously described. The output of the buffer register set 46 is connected through the computer comparison unit 50 to the tape punch unit 36 as previously described with reference to FIG. 1.

Figure 7:
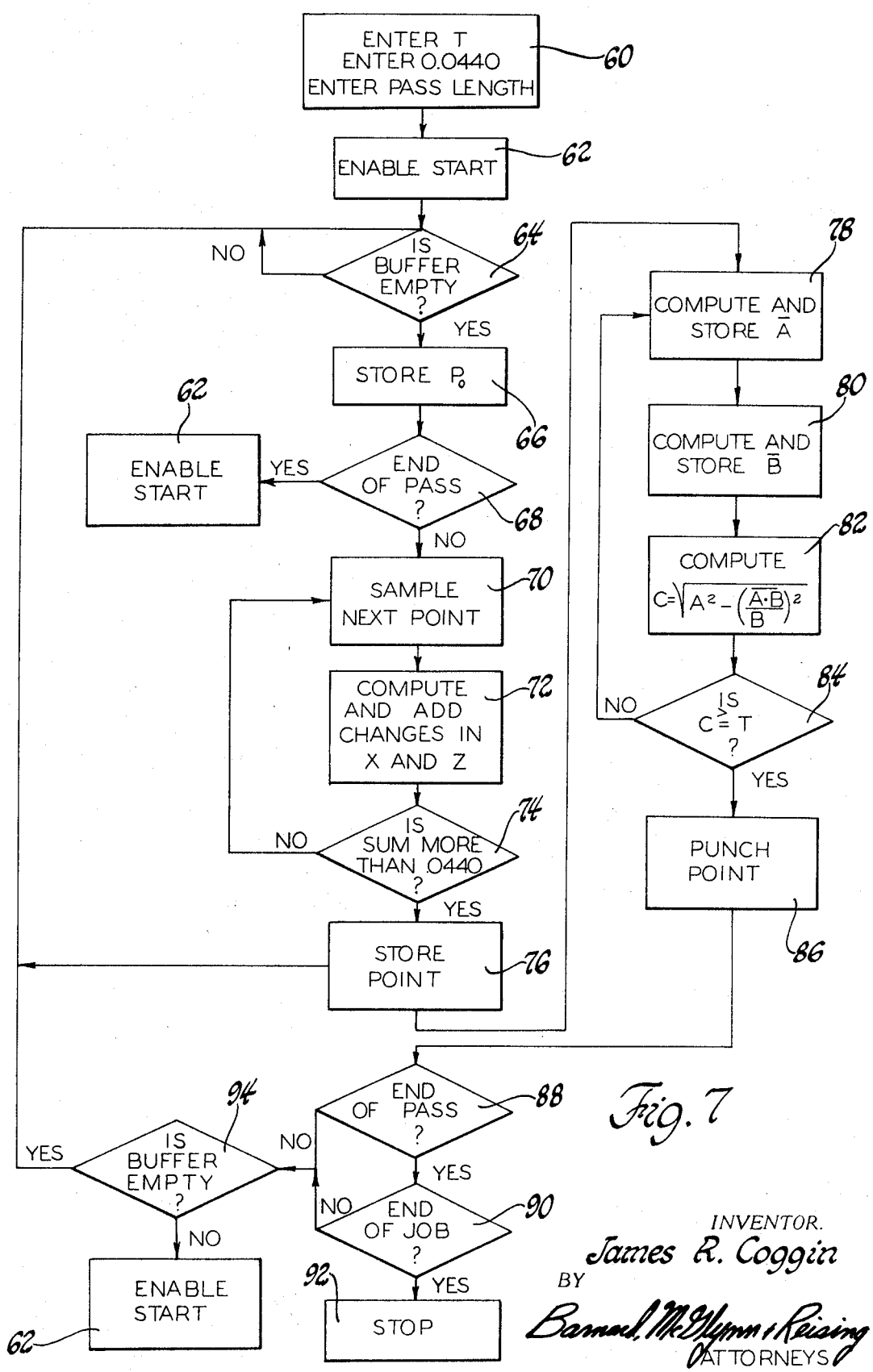
FIG. 7 is a functional flow chart useful in preparing a mechanized system for carrying out the invention.

FIG. 7 is a flow chart illustrating the functional manner in which the computer 28 may be programmed to carry out the subject method. In FIG. 7 the block 60 represents the operator functions of entering into the computer 28 (a) the desired displacement of probe 12 between the points to be temporarily recorded as shown in FIG. 2, (b) the value of the tolerance T to which the chord height C is to be compared during the optimization process, and (c) the pass length of the probe 12. This data is stored in the memory unit of the computer 28 in the conventional fashion. The "enable start" block 62 represents the operator function in controlling the switch 40 in FIG. 5 to indicate to the computer that a pass of probe 12 over the surface 14 is to be begun and that data is to be sampled and stored. Block 64 indicates a computer function in determining whether the buffer storage unit 26 is empty so as to be in condition to accept new coordinate data. If the block is not empty, the computer waits an appropriate period before again checking the condition of the buffer unit 26. If the buffer unit is empty, the computer performs the function indicated by block 66 of storing the coordinates of the initial point $P_0$. After the storage of the initial point, the computer may be programmed as indicated by block 68 to determine whether the end of a pass has been reached by reference to the data inserted by the operator during the initialization operation. If the end of the pass has been reached, the computer function is terminated requiring the operator to operate the switch 40 again. If the end of a pass has not been reached, the computer is instructed to sample the next point as indicated by block 70. At the time the next point is sampled, the computer performs the function indicated by block 72 of computing the probe displacement by adding the total X and Z coordinate displacements and, as indicated by computer function block 74 comparing the sum to the incremental value 0.044 inch which is entered by the operator during the initialization function. If the total probe displacement is less than the predetermined limit, the computer goes back to the function represented by block 70 and samples the next point. If the total displacement is more than 0.0440 inch, the computer goes on to store the point $P_1$ for example, in the buffer storage unit 26 as indicated by computer function block 76.

After at least two points have been stored in the buffer unit 26, the computer recycles back to block 64 and continues the sampling and storage function. In the meantime, the computer begins operating in what is commonly termed a "background mode" to optimize the data and control the operation of the tape punch 36. This is represented in FIG. 7 by the line drawn between the block 76 and the block 78. Block 78 represents a computer function in computing and storing the vector value $\overline{A}$ which represents the vector between the initial point $P_0$ and the second point $P_1$ which is stored in the buffer storage unit 26. The computer goes on to compute and store the value of the vector quantity $\overline{B}$, as indicated by block 80, which vector quantity represents the chord extending between the initial point $P_0$ and the third sampled and stored point $P_2$. As indicated by computer function block 82 the computer goes on to compute the chord height C in accordance with the formula previously given and also as represented in the block 82.

After calculating the chord height C, this value is compared to the tolerance T which is entered by the operator during the initialization function 60. If the chord height C is less than the tolerance T, the computer recycles through the blocks 78, 80 and 82 to determine a new chord height as previously described with reference to FIGS. 2, 3 and 4. However, if the chord height C is equal or greater than the tolerance T and computer commands the transfer of the coordinates to the tape punch unit 36 as indicated by the computer function block 86.

After transferring the coordinates of a point to the tape punch unit 36, the computer again determines whether the end of a pass has been reached as indicated by function block 88. If the pass has been terminated, the computer determines whether the entire scan constituting several passes as indicated by FIG. 6 has been completed. If the job has been completed, the computer terminates its operation as indicated by computer function block 92. On the other hand, if neither the end of a pass nor the end of a job has been reached, the computer again determines whether the buffer storage unit 26 is empty as indicated by computer function block 94. If the buffer storage unit 26 is not empty, the computer may temporarily suspend operations and require the operator to operate the switch 40 as indicated by the block 96. However, if the buffer storage unit is empty, the computer recycles back to the function block 64 and the ends sampling and storing data as previously described.

It is to be understood that the functions illustrated by FIG. 7 can be carried out in any of several commercially available general purpose computers using such programming instructions and techniques as are compatible with such computers and are of particular appeal to the programmer setting up the performance of the previously described process in the particular computer with which he is provided. It is also to be understood that various modifications to the process described with reference to the specific embodiment can be made without departure from the spirit and scope of the invention. For a definition of the invention reference should be had to the following claims.

The embodiments of the invention in which an exclusive property or privilege is claimed are defined as follows:

1. A method for producing a numerical control record containing coordinate data defining a surface contour to a predetermined degree of accuracy comprising the steps of: scanning the surface to obtain data representing the coordinates of a plurality of points measured relative to at least two predetermined axes of the surface, optimizing the data by progressively examining the coordinates to identify points the coordinates of which represent a change in one coordinate value as between a point and a previous point of greater than a predetermined reference value for a given change between the other coordinate values of said points and previous point, and storing on said record only those points so identified.

2. A method for producing a numerical control record containing coordinate data defining a surface contour to a predetermined degree of accuracy comprising the steps of: scanning the surface along a first axis and at a predetermined coordinate along a second orthogonal axis and measuring the displacement of the surface relative to a third orthogonal axis to obtain data representing the coordinates of a plurality of points on the surface, optimizing the data by progressively examining the coordinates to determine those coordinates which represent a change in one coordinate value relative to the same coordinate of a previous point of greater than a predetermined reference value for a given change between the other coordinate values of said points and previous points, and storing on said record only those points so identified.

3. The method defined in claim 2 wherein the step of scanning the surface is carried out by contacting the surface with a probe.

4. A method for producing a numerical control record containing coordinate data defining a surface contour to a predetermined degree of accuracy comprising the steps of: placing a part defining the surface in a reference position to establish at least first and second mutually perpendicular measurement axes, displacing a scanner probe over the surface through predetermined increments along the first axis and measuring the coordinates of the probe path along the second axis at each of the increments to obtain data representing the axial coordinates of a plurality of points, storing the data, optimizing the data by progressively examining the coordinates to identify points the coordinates of which represent a change in one coordinate value relative to the same coordinate of a previous point of greater than a predetermined reference value for a given change between the other coordinate values of said points and previous point, and storing on said record only those points so identified.

5. A method for producing a numerical control record containing coordinate data defining a surface contour to a predetermined degree of accuracy comprising the steps of: placing a part defining the surface in a reference position to establish at least first and second mutually perpendicular measurement axes, displacing a scanner probe over the surface from an initial point through at least two predetermined increments along the first axis and measuring the coordinates of the probe to obtain data representing the axial coordinates of at least three spaced points along the first axis, storing the data, optimizing the data by effectively determining the distance between the second of the points and a chord extending between the first and third of the points, comparing the distance to a predetermined reference distance, and transferring to the numerical control record only the coordinates of the first point and any subsequent point for which the distance so determined at least equals the predetermined reference distance.

6. A method for producing a numerical control record containing coordinate data defining a surface contour to a predetermined degree of accuracy comprising the steps of: placing a part defining the surface in a reference position to establish at least first and second mutually perpendicular measurement axes, displacing a scanner probe over the surface from an initial point through a plurality of predetermined increments along the first axis and measuring the coordinates of the probe to obtain data representing the axial coordinates of a plurality of points and along the first axis, storing the data, optimizing the data by sequentially comparing the distances from chords extending between an initial point and progressively spaced subsequent points to given points intermediate the initial and subsequent points to a reference distance until a distance so compared at least equals the reference distance, and transferring to the numerical control record only the coordinates of the initial point and any such given point for which the distance so compared at least equals the reference distance.

7. A method for producing a numerical control record containing coordinate data defining a surface contour to a predetermined degree of accuracy comprising the steps of: placing a part defining the surface in a reference position to establish at least first and second mutually perpendicular measurement axes, displacing a scanner probe over the surface from an initial point through a plurality of predetermined increments along the first axis and measuring the coordinates of the probe to obtain data representing the axial coordinates of a plurality of points along the first axis, storing the data, optimizing the data by sequentially comparing the distances from chords extending between an initial point and progressively spaced subsequent points to given points intermediate the initial and subsequent points to a reference distance until a distance so compared at least equals the reference distance, thereafter comparing the distance from chords extending between the first such given point for which the distance so compared at least equals the reference distance and at least one subsequent point to a second given point intermediate the first such given point and the second given point to the predetermined reference distance, and transferring to the numerical control record only the coordinates of the initial point and any such given point for which the distance so compared at least equals the reference distance.

8. A method for producing a numerical control record containing coordinate data defining a surface contour to a predetermined degree of accuracy comprising the steps of: placing a part defining the surface in a reference position to establish at least first and second mutually perpendicular measurement axes, displacing a scanner over the surface from an initial point through a plurality of predetermined increments along the first axis and measuring the coordinates of the surface at each of the increments to obtain data representing the axial coordinates of a plurality of points on the surface and along the first axis, recording the data in a digital form, optimizing the data by sequentially comparing the distances from chords extending between an initial point and progressively spaced subsequent points to given points intermediate the initial and subsequent points to a reference distance until a distance so compared at least equals the reference distance, thereafter comparing the distance from chords extending between the first such given point for which the distance so compared at least equals the reference distance and at least one subsequent point to a second given point intermediate the first such given point and the second given point to the predetermined reference distance, and transferring to the numerical control record only the coordinates of the initial point and any such given point for which the distance so compared at least equals the reference distance.

9. A method for producing a numerical control tape containing coordinate data defining a surface contour to a predetermined degree of accuracy comprising the steps of: placing a part defining the surface in a reference position to establish at least first and second mutually perpendicular measurement axes, displacing a scanner over the surface from an initial point through a plurality of predetermined increments along the first axis and measuring the coordinates of the surface at each of the increments to obtain data representing the axial coordinates of a plurality of points on the surface and along the first axis, storing the data in digital form in a buffer storage unit, optimizing the data in a digital computer having access to the buffer storage unit by sequentially comparing the distances from chords extending between an initial point and progressively spaced subsequent points to given points intermediate the initial and subsequent points to a reference distance until a distance so compared at least equals the reference distance, thereafter comparing the distance from chords extending between the first such given point for which the distance so compared at least equals the reference distance and at least one subsequent point to a second given point intermediate the first such given point and the second given point to the predetermined reference distance, and transferring to the numerical control tape under the control of the computer only the coordinates of the initial point and any such given point for which the distance so compared at least equals the reference distance.

* * * * *